United States Patent
Yamich et al.

(10) Patent No.: US 11,273,384 B2
(45) Date of Patent: Mar. 15, 2022

(54) ALL-TERRAIN AMUSEMENT RIDE VEHICLE AND CONTROL SYSTEM

(71) Applicant: DYNAMIC ATTRACTIONS LTD., Winnipeg (CA)

(72) Inventors: Powers Alexander Yamich, Orlando, FL (US); John C. Nappo, Orlando, FL (US); Brandon Anthony Tuero, Winter Garden, FL (US); Michael Andrew Haimson, Orlando, FL (US)

(73) Assignee: DYNAMIC ATTRACTIONS LTD., Winnipeg (CA)

( * ) Notice: Subject to any disclaimer, the term of this patent is extended or adjusted under 35 U.S.C. 154(b) by 125 days.

(21) Appl. No.: 16/339,711

(22) PCT Filed: Nov. 13, 2018

(86) PCT No.: PCT/CA2018/051437
§ 371 (c)(1),
(2) Date: Apr. 4, 2019

(87) PCT Pub. No.: WO2019/090440
PCT Pub. Date: May 16, 2019

(65) Prior Publication Data
US 2021/0170287 A1 Jun. 10, 2021

Related U.S. Application Data

(60) Provisional application No. 62/585,211, filed on Nov. 13, 2017.

(51) Int. Cl.
*A63G 25/00* (2006.01)
*A63G 31/00* (2006.01)
(Continued)

(52) U.S. Cl.
CPC .............. *A63G 25/00* (2013.01); *A63G 31/00* (2013.01); *B62D 15/025* (2013.01)

(58) Field of Classification Search
CPC .......... A63G 31/00; A63G 31/16; A63G 7/00; A63G 25/00; B60R 2021/0097; B60R 21/105
(Continued)

(56) References Cited

U.S. PATENT DOCUMENTS

5,403,238 A * 4/1995 Baxter ................... A63G 31/16
104/78
5,473,990 A * 12/1995 Anderson .............. A63G 31/16
104/154
(Continued)

*Primary Examiner* — Kien T Nguyen
(74) *Attorney, Agent, or Firm* — Baker Hostetler (57) ABSTRACT

There is provided an all-terrain amusement ride vehicle and control system. Specifically, there is provided and autonomous all-terrain amusement ride vehicle and control system therefore which is configured to use real terrain to create guest sensations. Whether indoors or outdoors, real terrain such as hills, bridges, bumpy roads, and stairs can be used to create sensations that have sustained gravitational forces (G-forces) wherein these G-forces are at least in part based on the terrain. By providing autonomous features and an overall fleet control system, guests can experience a safe operator-initiated ride but with a feeling of being in an unconstrained environment.

17 Claims, 9 Drawing Sheets

(51) Int. Cl.
*B62D 15/02* (2006.01)
*B62D 6/00* (2006.01)

(58) Field of Classification Search
USPC .................................................. 472/43, 59–60
See application file for complete search history.

(56) References Cited

U.S. PATENT DOCUMENTS

2015/0336012 A1* 11/2015 Maycock ................. A63J 25/00
  701/2
2015/0336013 A1* 11/2015 Stenzler ............. G06K 9/00771
  700/90
2018/0036644 A1* 2/2018 Wright ................... A63G 31/00

\* cited by examiner

ALL-TERRAIN AMUSEMENT RIDE VEHICLE AND CONTROL SYSTEM

CROSS REFERENCE TO RELATED APPLICATIONS

This application is a U.S. national stage of International Application No. PCT/CA2018/051437, filed on Nov. 13, 2018, which claims the benefit of priority to U.S. Patent Application Ser. No. 62/585,211 entitled "Autonomous All-Terrain Theme Park Vehicle" filed Nov. 13, 2017, which is hereby incorporated by reference in its entirety.

FIELD OF THE INVENTION

The present invention pertains to the field of amusement rides and in particular to an all-terrain amusement ride vehicle and control system.

BACKGROUND

Conventional multi-axis simulator rides suffer inefficiencies which limit the level of "thrill" the rides are capable of generating. In general, a more thrilling ride tends to be a more popular ride. The simulators achieve thrills by using various mechanical actuators to move a passenger compartment to simulate terrain, steep drops and high-speed turns.

Conventional amusement park rides are bound to a flat floor and travel along a rail, or in the case of an amusement park automatic guided vehicles (AGV) they travel along a pre-defined path with a flat floor. To simulate the experience of terrain or changes in elevation a motion base is used to provide this experience.

Accordingly, the need exists for an amusement ride vehicle and system which is capable of providing a thrill and experience which is equal to or greater than that experienced on a multi-axis simulator amusement ride or current AGV, while being safe with the feeling of being in an unconstrained environment. From this the need arises for an amusement ride vehicle that can navigate variable inclines, banks, changes in elevation, and scene theming such as stairs, or rocks.

This background information is provided to reveal information believed by the applicant to be of possible relevance to the present invention. No admission is necessarily intended, nor should be construed, that any of the preceding information constitutes prior art against the present invention.

SUMMARY

An object of the present invention is to provide an all-terrain amusement ride vehicle and control system. In accordance with an aspect of the present invention, there is provided an amusement ride vehicle including a transport assembly configured to move the vehicle, the transport assembly including a propulsion system and a steering system. The vehicle further including a control system operative to provide operational instructions to the propulsion system and the steering system, the control system further including a vehicle navigation controller having at least two channels, each channel independently collecting operational characteristics of the vehicle. The control system operative to at least compare the operational characteristics from each channel to determine accuracy of the operational characteristics, and the control system further operative to process the operational characteristics together with a defined path of travel of the vehicle for determination of the operational instructions.

In accordance with an aspect of the present invention, there is provided a method for controlling an amusement ride vehicle, the amusement ride vehicle including a propulsion system and a steering system for moving the vehicle. The method includes receiving a first input from a first sensory array, the first input indicative of vehicle operational status and location. The method further including receiving a second input from a second sensory array, the second sensory array independent from the first sensory array, the second input indicative of vehicle operational status and location. The method further includes comparing the first input and the second input thereby determining accuracy of the received vehicle operational status and location and upon determination that the first input and second input vary by less than a predefined tolerance, comparing the vehicle operational status and location with a desired route. The method additionally includes calculating operational parameters for the propulsion system and the steering system based on a variation between the vehicle operational status and location with a desired route and transmitting instructions to the propulsion system and the steering system, the instructions indicative of the operational parameters.

In accordance with an aspect of the present invention there is provided a control system for an amusement ride vehicle that includes a propulsion system and a steering system for moving the vehicle. The control system includes a network interface for receiving and transmitting data, a processor and a non-transient memory for storing instructions. The instructions when executed by the processor cause the control system to receive a first input from a first sensory array, the first input indicative of vehicle operational status and location. The instructions when executed by the processor further cause the control system to receive a second input from a second sensory array, the second sensory array independent from the first sensory array, the second input indicative of vehicle operational status and location. The instructions when executed by the processor further configure the control system to compare the first input and the second input thereby determining accuracy of the received vehicle operational status and location and upon determination that the first input and second input vary by less than a predefined tolerance, compare the vehicle operational status and location with a desired route. The instructions when executed by the processor cause the control system to calculate operational parameters for the propulsion system and the steering system based on a variation between the vehicle operational status and location with a desired route and transmit instructions to the propulsion system and the steering system, the instructions indicative of the operational parameters.

In accordance with another aspect of the present invention, there is provided a method for controlling at least two amusement ride vehicles in an amusement ride. The method includes receiving first operational data from a first vehicle, the first operational data indicative of first vehicle operational status and location. The method further including receiving second operational data from a second vehicle, the second operational data indicative of second vehicle operational status and location. The method further includes correlating the first operational data, the second operational data and parameters of the amusement ride and upon correlation, determining first operational parameters for the first vehicle and second operation parameters for the second vehicle. The method also includes transmitting the first operational parameters to the first vehicle and transmitting the second operational parameters to the second vehicle.

In accordance with another aspect of the present invention, there is provided a wayside control system for controlling at least two amusement ride vehicles in an amusement ride. The wayside control system includes a network interface for receiving and transmitting data, a processor and a non-transient memory for storing instructions. The instructions when executed by the processor cause the wayside control system to receive first operational data from a first vehicle, the first operational data indicative of first vehicle operational status and location. The instructions when executed by the processor further cause the wayside control system to receive second operational data from a second vehicle, the second operational data indicative of second vehicle operational status and location. The instructions when executed by the processor additionally cause the wayside control system to correlate the first operational data, the second operational data and parameters of the amusement ride and upon correlation, determine first operational parameters for the first vehicle and second operation parameters for the second vehicle. The instructions when executed by the processor further cause the wayside control system to transmit the first operational parameters to the first vehicle and transmitting the second operational parameters to the second vehicle.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

The present invention provides an all-terrain amusement ride vehicle and control system. Specifically, there is provided an all-terrain amusement ride vehicle configured to use real terrain to create guest sensations. Whether indoors or outdoors, real terrain such as hills, bridges, bumpy roads, and stairs can be used to create sensations that have sustained gravitational forces (G-forces) wherein these G-forces are at least in part based on the terrain. In some embodiments, by providing autonomous features and an overall fleet control system, guests can experience a safe operator-initiated ride but with a feeling of being in an unconstrained environment.

Movement of the amusement ride vehicle throughout the attraction or amusement ride, may be controlled by an electronic control system. The electronic control system controls and coordinates the movement of the vehicle and may be programmable. Accordingly, the guests are not required to drive the vehicle along a track or to take any action during the ride. In a particular embodiment, the electronic control system controls the location of the vehicle with respect to a path followed by the vehicle throughout the amusement ride or attraction. The control data may be stored in a programmable memory associated with the control system, wherein each piece of data is indexed by the position of the vehicle along the path.

In more particular aspects, a plurality of alternative attraction or amusement ride programs may be stored and selected, or one of a plurality of alternative paths that the vehicle may follow may be selected. The motion of the vehicle throughout the attraction or amusement ride is determined by the path. The path may be predetermined or arbitrary. A predetermined path may comprise a set of navigation instructions.

In one aspect, a central controller may exercise control over one or more vehicles, including the ability to stop the vehicles and to enable them to proceed. The vehicles each have a steering system (e.g. electric motor or actuator) in communication with the central controller to steer the respective vehicle and also a propulsion system (e.g. electric or combustion motor) to provide movement of the vehicle itself. The central controller communicates with each vehicle using, for example, radio frequency or infrared transmitters. As explained above, the electronic control system may govern a plurality of vehicles operating within the amusement ride or attraction. A position sensor may sense the position of the respective vehicle along the path.

The body of the vehicles may take on any desired appearance, and may be themed to a selected environment. For example, the body can be configured to resemble a transportation vehicle, such as an all-terrain vehicle, a jeep, a car, or a truck, or it may be configured to resemble the shape of an animal or other object. It will be appreciated that the body may comprise a variety of structural components that are adapted to carry at least one passenger.

The ride experience enjoyed by the passenger is unique because the vehicle actually moves the passenger along the path in the amusement ride or attraction. The ride experience can be safe, while providing the desired motion sensations and overall ride experience.

An aspect of the vehicle is its versatility and ability to be reprogrammed or include a plurality of selectable programs, to provide varying experiences. For example, in some embodiments, each of the vehicles can be programmed differently from the other vehicles. In this way, the differently programmed vehicles can be used to provide the passengers with different ride experiences along a different path each time the passenger rides a differently programmed vehicle.

Figure 1:
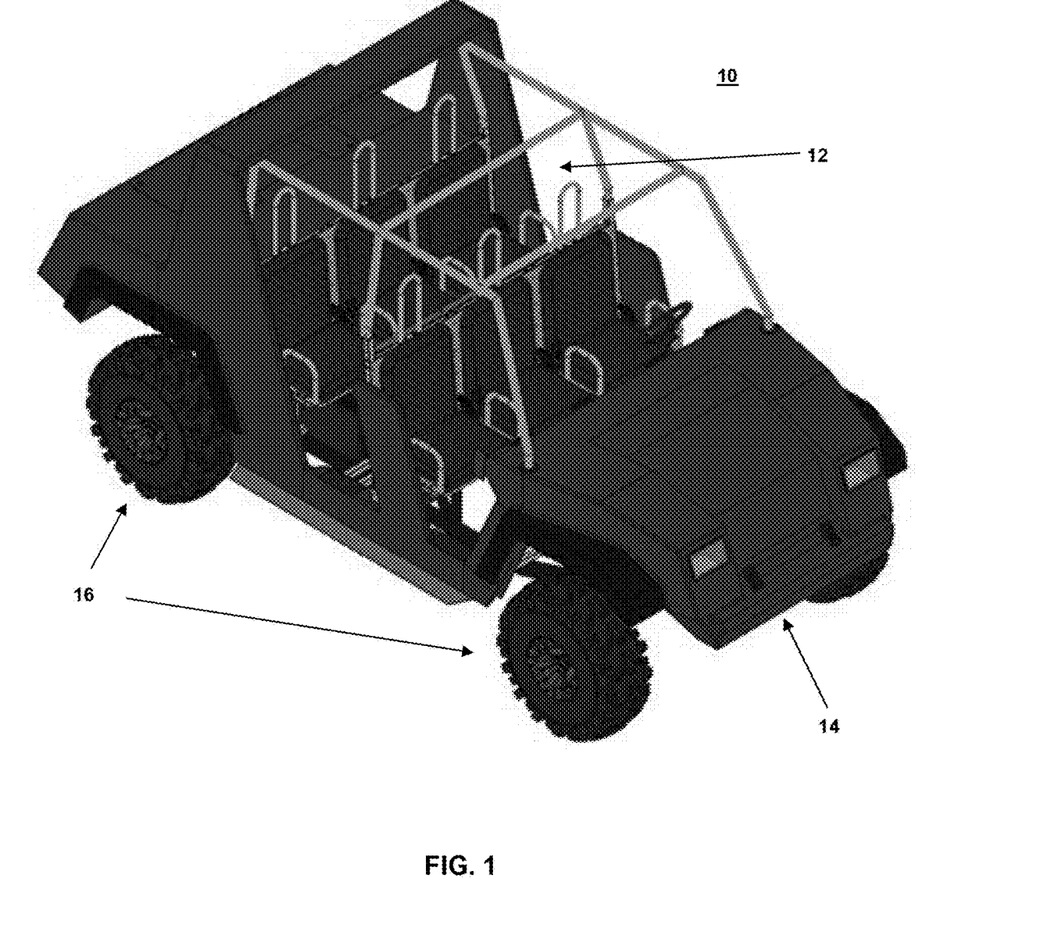
FIG. 1 illustrates an all-terrain amusement ride vehicle according to embodiments of the present invention.

In FIG. 1 illustrates an all-terrain amusement ride vehicle according to embodiments of the present invention. The vehicle 10 can be guided through an amusement ride or attraction without use of a physical rail and includes a plurality of wheels 16 mounted to a chassis 14. The wheels 16 which is some embodiments can be configured as tracks, allow for movement of the vehicle along a path associated with the terrain. The chassis 14 supports a passenger or payload compartment 12 where one or more guests or payload can ride.

Figure 2:
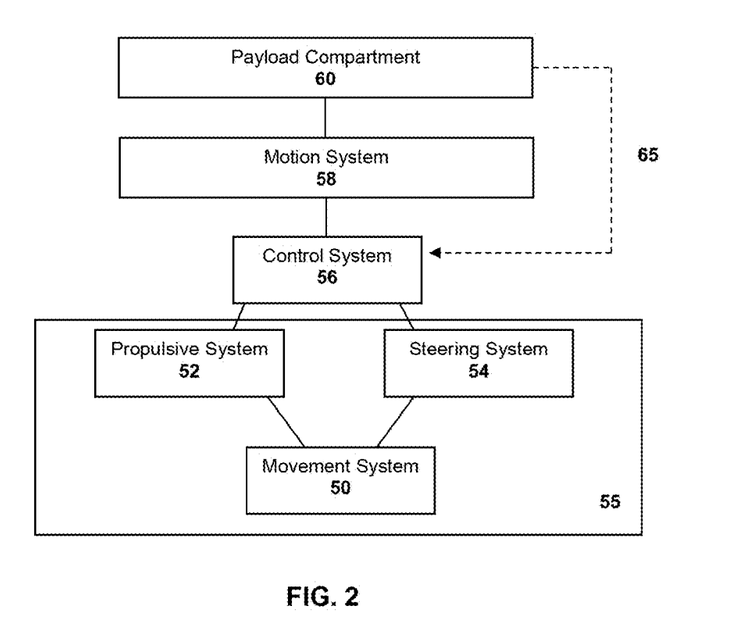
FIG. 2 illustrates the components of an amusement ride vehicle in accordance with embodiments of the present invention.

FIG. 2 illustrates the components of a amusement ride vehicle in accordance with embodiments of the present invention. According to embodiments, the vehicle includes a transport assembly 55, can include a chassis, a propulsive system 52, a steering system 54 and optionally a suspension system. In addition, the vehicle includes a control system 56 which is operative to control operation of the vehicle, which can include at least the propulsion system 52 and the steering system 54. The propulsion system 52 and the steering system 54 are operatively connected to the movement system 50 which enable the desired movement of the vehicle. The movement system 50 can be configured as wheels, tracks, rollers, air movement system, fluid movement system or other configuration of a movement system that can enable movement of the vehicle.

According to embodiments, the control system includes a multi-channel vehicle navigation controller which is configured to provide vehicle guidance, control, and navigation. According to embodiments, the multi-channel vehicle navigation controller includes at least two channels which independently collect and optionally process vehicle operational characteristics. The subsequent comparison of the data from each channel by the vehicle control system can provide confirmation and validation of the collected and optionally processed vehicle operational characteristics. However, for further redundancy the multi-channel vehicle navigation controller can include more than two channels.

In some embodiments, the vehicle further includes a payload compartment 60 to carry a payload that can be used for either transporting guests or equipment. It will be readily understood that a payload compartment can take on a variety of different configurations. For example, a payload compartment can be a platform, seat, cabin, open air seating or other configuration as would be readily understood by a worker skilled in the art.

In some embodiments the payload compartment 60 is mounted above a motion system 58 which can add or modify (e.g. amplify or dampen) one or more degrees of freedom of the payload compartment 60 relative to the transport assembly. In some embodiments, the motion system 58 is configured as a motion base that can be configured as a separate assembly mounted on the transport assembly and configured to be operatively coupled to the payload compartment 60 thus providing the desired one or more relative degrees of freedom between the transport assembly and the payload compartment. In other embodiments, the motion system 58 can be configured as the suspension system associated with the transport assembly. The suspension system in this embodiment can be configured as an active suspension system which can be used to enhance physical features over which the vehicle is travelling or to simulate another type of motion as desired. The extra motions imposed on the payload compartment by the motion system may include but are not limited to motions such that an oil slick can be simulated, desired motions can be exaggerated, or high frequency effects may be simulated.

According to embodiments, the onboard systems of the vehicle can be powered by a locally stored power supply (e.g. battery system) and may be electrically recharged during operational downtime or at predefined locations along the path of the vehicle during operation. For example, the vehicle may have an onboard battery system such that charging occurs at opportune moments through a contact charging system or through induction pads systems located in the amusement ride or attraction, for example along the path being travelled by the vehicle.

The vehicle is propelled along through use of a powered drivetrain and powered steering system to move and guide the vehicle through the amusement ride or theme park environment. The steering system controls two or more wheels (or tracks depending the embodiment) to achieve a coordinated steering center. The vehicle may have a passive suspension system such that variable terrain can be navigated and traversed or an active suspension system such that the environment being traversed can be accentuated or dampened as needed.

Figure 3:
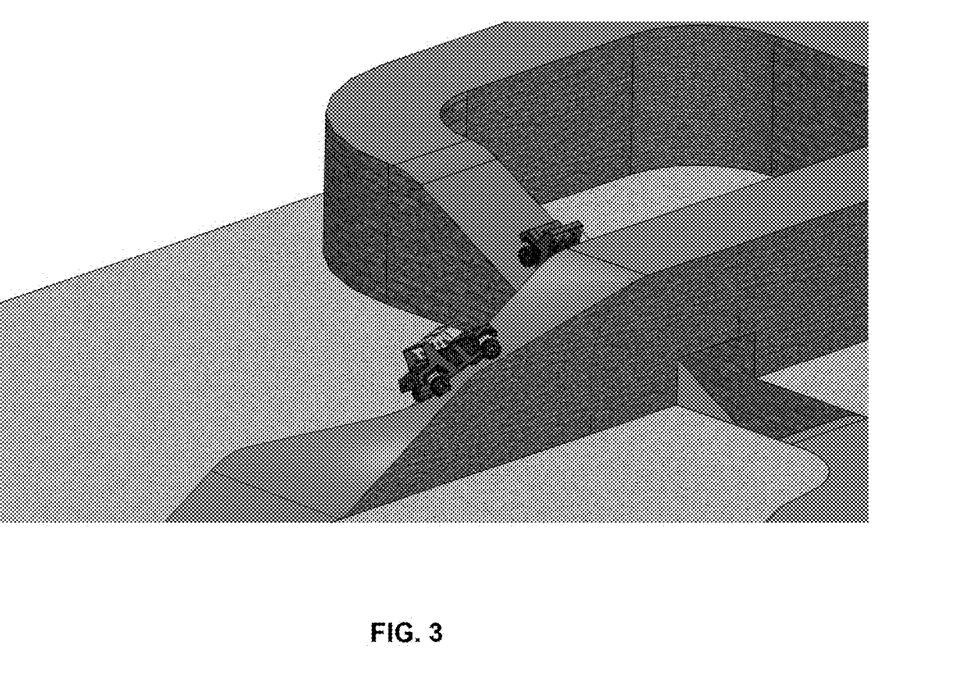
FIG. 3 illustrates an amusement ride vehicle following a path which includes changes in elevation, inclination and banking, in accordance with embodiments of the present invention.
Figure 4:
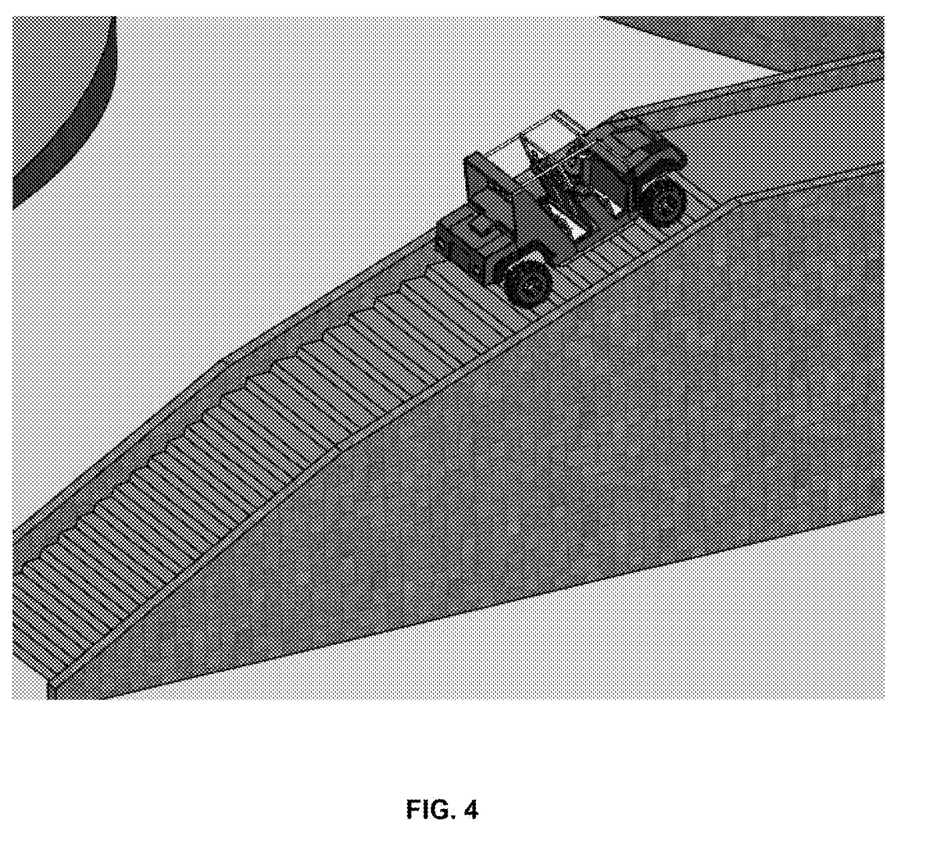
FIG. 4 illustrates an amusement ride vehicle following a path travelling up a set of stairs, in accordance with embodiments of the present invention.
Figure 5:
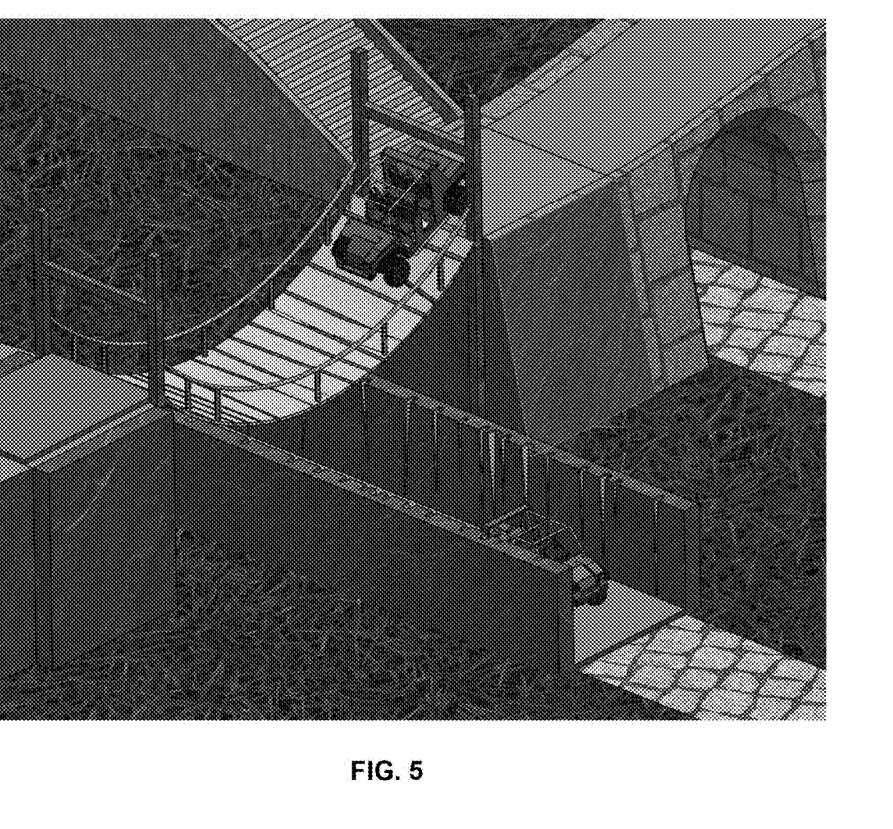
FIG. 5 illustrates an amusement ride vehicle travelling over a suspension bridge, in accordance with embodiments of the present invention.

According to embodiments, the vehicle follows a predetermined path through terrain with changes in elevation, inclination, banking, and various terrain theming aspects. For example, FIG. 3 illustrates an amusement ride vehicle following a path which includes changes in elevation, inclination and banking. FIG. 4 illustrates an amusement ride vehicle following a path travelling up a set of stairs and FIG. 5 illustrates an amusement ride vehicle travelling over a suspension bridge. It will be readily understood that the types of paths discussed and illustrated are to be considered as non-limiting, and it would be readily understood that the paths configurations can be adapted to relate to the theme of the amusement ride for example. It will be readily understood that terrain as used herein, can define a variable terrain, for example hills, bridges, bumpy roads, rickety bridges, stairs or the like, terrain can also be used to define a surface over which the vehicle travels which is flat in nature, or planar. As such, the use of terrain is used to define any surface configuration over which the vehicle can travel.

In some embodiments, the amusement ride vehicle may move along a desired path such that the guests are able to view a show as intended. This desired path may be stored in the control system of the vehicle and the execution of the defined path can be monitored by one or more of the vehicle control system and a wayside control system which controls the complete amusement ride or attraction. The amusement ride vehicle may have multiple paths stored thereon and corresponding data stored such that multiple guest experiences, namely the following of different paths, are possible in a single amusement ride or attraction.

With further reference to FIG. 2, in some embodiments within the payload compartment there is an interface (not shown) operatively coupled 65 with the control system, which can provide the one or more guests with the ability to at least partially influence the operation of the vehicle. According to embodiments, the trajectory and speed of the vehicle is influenced by actions of the guests. For example, in some embodiments, one or more of the trajectory and speed of the vehicle may be pre-defined and subsequently influenced by the onboard or offboard guests. In some embodiments, the vehicle can be confined to a predefined area through software, for example defined by a geofence, and the operation of the vehicle can only be influenced by the guests when the vehicle is located within this predefined area.

In some embodiments, the degree of guest influence of the operation of the vehicle can range from zero to complete control of the vehicle. For example, a vehicle would follow a traditional theme of the amusement ride or attraction narrative and thus predefined path or route through the ride, when a guest has no influence on operation of the vehicle. According to some embodiments, the guest influence can be specifically related to one or more of the trajectory and speed of the vehicle. In some embodiments, the guest influence relates to the selection from a collection of predefined paths associated with the vehicle, for example stored in the memory of the vehicle control system.

In embodiments of the present invention the vehicle guidance, control, and navigation, is handled via a multi-channel vehicle navigation controller. For example, at least two channels are used for redundancy where the values from each channel are compared by the vehicle control system for confirmation of the detected values. However, for further redundancy more than two channels can be used for control of operation of the amusement ride vehicle.

According to embodiments, each channel of the vehicle navigation controller is operatively connected to sensor array from which is receives a plurality of signals relating to the vehicle. Each sensor array can include sensors that provide data indicative of the location or position of the vehicle. The position or location may be defined by 3-dimensional space, such that the x, y, and z coordinates, or 2-dimensional space or other manner in which the position of the vehicle can be defined. Each sensory array may further provide data indicative of the angular orientation of the vehicle. Other parameters which may be collected by a sensor or sensor array which are indicative of the vehicle would be readily understood by a worker skilled in the art. For example, the sensors can include one or more of global positioning system sensor, altimeters, proximity sensors, tilt sensor, gyroscope, speedometer, accelerometer, inertial measurement unit (IMU) or other sensor configuration which can provide data indicative of vehicle location, orientation, direction and/or speed of movement, proximity to other vehicles and/or obstructions and the like.

Figure 6:
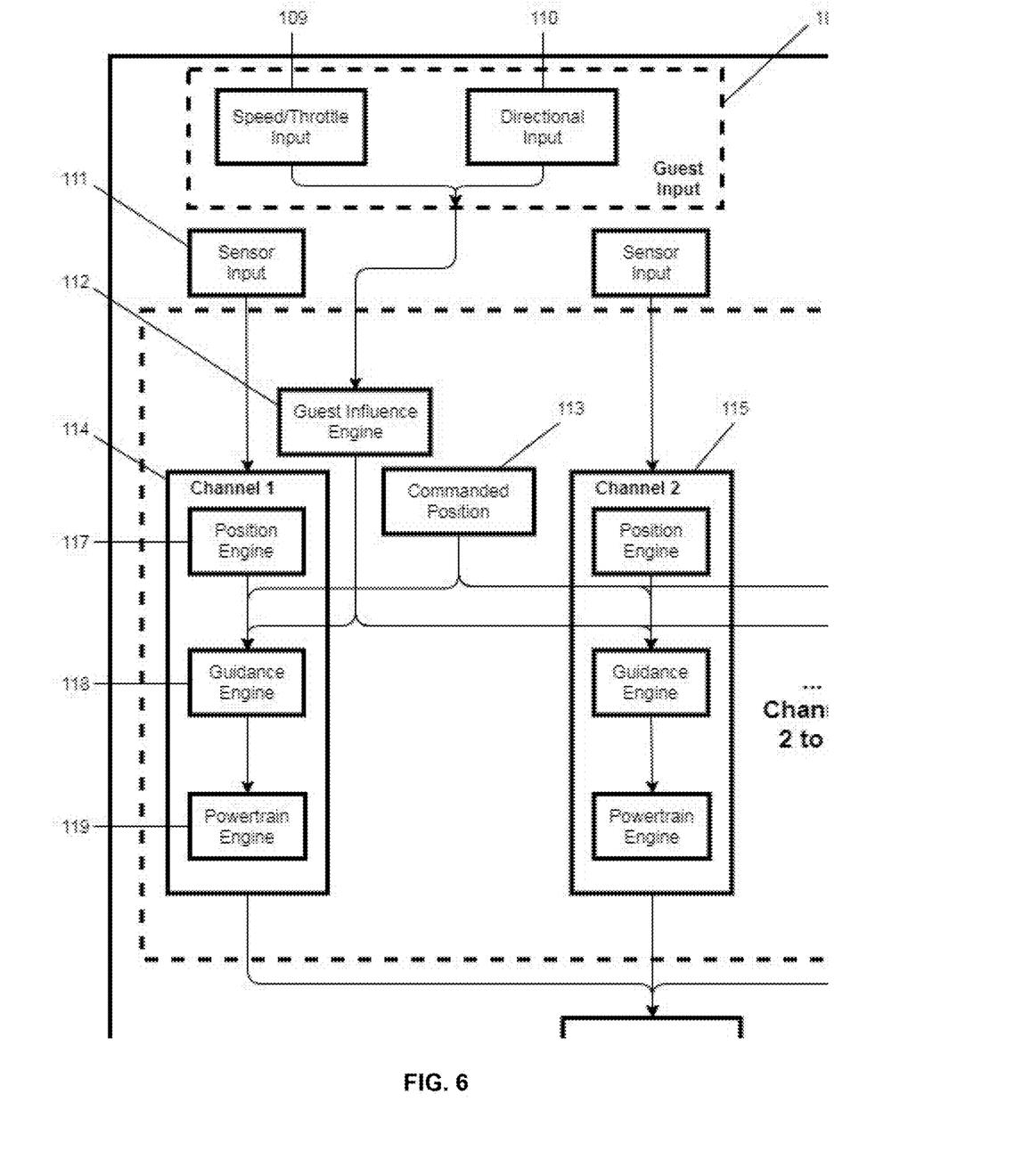
FIG. 6 illustrates a vehicle control system and wayside control system in accordance with embodiments of the present invention.

FIG. 6 illustrates a vehicle control system and wayside control system in accordance with embodiments of the present invention. The vehicle control system 101 refers to an onboard amusement ride vehicle control system. According to embodiments, the primary components of the vehicle control system are the vehicle navigation controller 102 the central processing unit (CPU) 103 and the related transport propulsion and steering drives 104. The vehicle navigation controller 102 employs a plurality of channels, 114, 115, 116, to provide data related to vehicle properties as discussed above, wherein the plural channels allow for a level of redundancy for vehicle guidance, navigation and control. Each of the multiple channels have a dedicated sensor input 111 from an associated sensor array which is feed into a channel specific position engine 117, guidance engine 118 and powertrain engine 119. Information from each of the channel specific position engine 117, guidance engine 118 and powertrain engine 119 are compared by the vehicle navigation controller for comparison and assessment of subsequent instructions for transmission to the CPU 103 which can determine instructions for transmission to the transport propulsion and steering drives 104. The transport propulsion and steering drives 104, subsequently transmit instructions to the propulsion system (not shown) and steering system (not shown) thereby controlling movement of the vehicle.

As illustrated in FIG. 6, the guidance engine 118 can be fed data from a guest influence engine 112 and a commanded position 113 (e.g. the next destination of a vehicle when travelling a predetermined path), wherein the guidance engine 118 can subsequently determine guidance parameters for further movement of the vehicle based on the received data. The guest influence engine 112 receives data from the guest input interface 108 which provide guest operational instructions which can include one or more of speed/throttle input 109 and directional input 110 which can be input by a guest via an interface located within the payload compartment. It is understood that the level of influence of the guest operational instructions can be varied from zero to 100% depending on one or more factors including safety, location and the like.

According to embodiments, the CPU 101 of the vehicle control system 101 can receive data from the wayside control system 105 through a radio frequency link 122. This data can include information related to other vehicles operating in the amusement ride, the stopping envelopes of the other vehicles, limits of interaction within the show associated with the amusement ride, vehicle exclusion zones and the like. This additional information received from the wayside control system 105 can provide the CPU 101 of the vehicle control system 101 to compute distances between vehicles and the interaction of their stopping envelopes with the facility and well as between vehicles in the fleet. This data includes the show interaction limits 120 and vehicle exclusion zones/zone time limits 121 which are stored in the memory associated with the wayside CPU 106. For example, vehicle exclusion zones can define areas within the amusement ride that the vehicle does not enter when guests are on board and zone time limits may define dwell times for the vehicle within a particular zone. In this manner, the wayside control system 105 can provide a level of overall control of each of the vehicles operating in the amusement ride in order to provide a level of safety and while ensuring the information is common to all vehicles.

According to embodiments, the data processed by the CPU 103 of the vehicle control system 101 can take the form of directional and propulsion values which can prevent vehicles from colliding. In addition, if it is determined that no risk exists the guest may be provided with a higher degree of influence on operation of the vehicle. In contrast, where a collision would occur should the guest have substantial influence, the guest influence engine 112 can decrease the level of guest influence and optionally provide alternate directional and propulsion input to prevent a collision. The guidance engine 118 takes the relevant data and feeds it to the powertrain engine 119 which computes the relevant kinematics and relays that are required as commands to the CPU 103 of the vehicle control system 101. The onboard CPU 103 then commands determines and provides the relevant transport propulsion and steering drives 104 with the appropriate instructions to execute the required commands.

With further reference to FIG. 6, the wayside control system 105 includes a wayside CPU 106 and a wayside navigation system 107. The wayside navigation system 107 collects data from all online vehicles to verify their reported location and status to their required location and status. The wayside navigation system 107 can also perform the task of routing vehicles to alternate areas such as the maintenance bay when that type of task is required. The show interaction limits 120 and the vehicle exclusion zones/zone time limits 121 are sent along with data from the wayside navigation system 107 through a radio frequency link 122 to the vehicle control system 101 and transferred to the vehicle navigation system 102 and to the guest influence engine 112. This information is used by the guest influence engine 112 to compute whether a given guest input combination will result in a safe trajectory within the defined zone with the surrounding vehicles.

Figure 7:
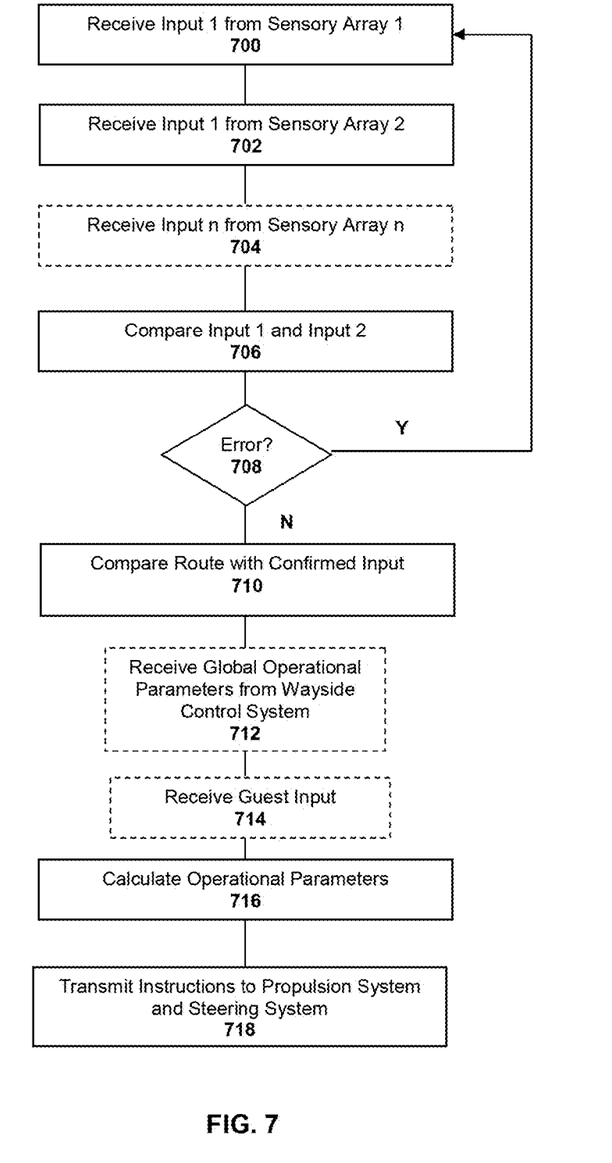
FIG. 7 illustrates a method performed by a vehicle control system in accordance with embodiments of the present invention.

FIG. 7 illustrates a method performed by a vehicle control system in accordance with embodiments of the present invention. Initially input 1 is received from sensory array 1 700 and input 2 is received from sensory array 2 702. Optionally, depending on the configuration of the vehicle navigation controller, the input n is received from sensory array n 704. The input 1 and in input 2 706 are compared or correlated, optionally with input n, in order to determine if there is any error 708 with the collected data indicative of the vehicle operational status and location. This correlation can provide a redundancy check in order to ensure accuracy of the data received from sensory arrays thus providing a level of safety. If there is an error detected, for example a variation between input 1 and input 2 above a predefined tolerance, the method is restarted with the receiving of new input 1 and input 2.

If there is no error detected, the route assigned to the vehicle is compared with the confirmed input 710. This comparison can provide a means for the calculation or determination of operational parameters 716 for the vehicle in order that the vehicle travels along the desired path. Upon the determination of the operational parameters 716, instructions are transmitted 718 to the propulsion system and the steering system in that the vehicle continues along the path.

In some embodiments, the method further includes receiving global operational parameters from a wayside control system 712, wherein these global operational parameters can provide additional information for the step of calculating operational parameters 716. These global operational parameters can include data indicative of other vehicles in the amusement ride, required changes to the assigned path, interaction limits which the show of the amusement ride, vehicle exclusion zones, time limits for operation of the vehicle within a particular zone and the like.

In some embodiments, the method further includes receiving guest input 714 or guest operational instructions, which can be received from a guest, for example a guest riding in the vehicle. This guest input is indicative of one or more guest defined operational parameters for the vehicle which can provide additional information for the step of calculating operational parameters 716. For example, the guest input can relate to a desired stopping location, speed of the vehicle, direction of the vehicle or other forms of guest input as would be readily understood.

Figure 8:
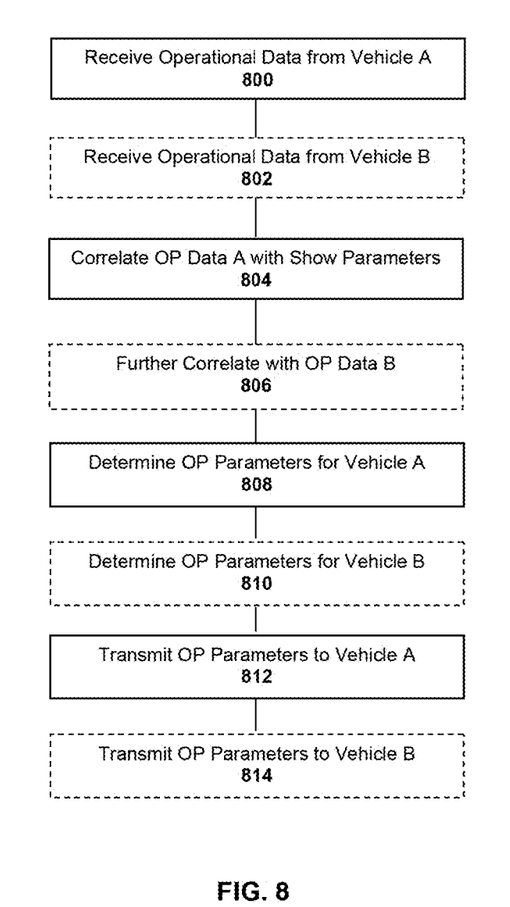
FIG. 8 illustrates a method performed by a wayside control system in accordance with embodiments of the present invention.

FIG. 8 illustrates a method performed by a wayside control system in accordance with embodiments of the present invention. Initially operational data is received from vehicle A 800 and this operational data is subsequently correlated with show parameters 804. Subsequently new operational parameters for vehicle A are then determined 808 and then these new operational parameters are transmitted 812 to vehicle A.

In some embodiments, the wayside control system further receives 802 operational data from vehicle B and this operational data can be further correlated 806 with the operational data from vehicle A and the show parameters. In these embodiments, the determination of the operational parameters of vehicle A 808, would thus be influenced by both the show parameters and the operational data of vehicle B. In addition, new operational parameters of vehicle B can be determined 810, and these operational parameters can be influenced by the show parameters and the operational data of vehicle A. These new operational parameters for vehicle B are then transmitted 814 to vehicle B.

Figure 9:
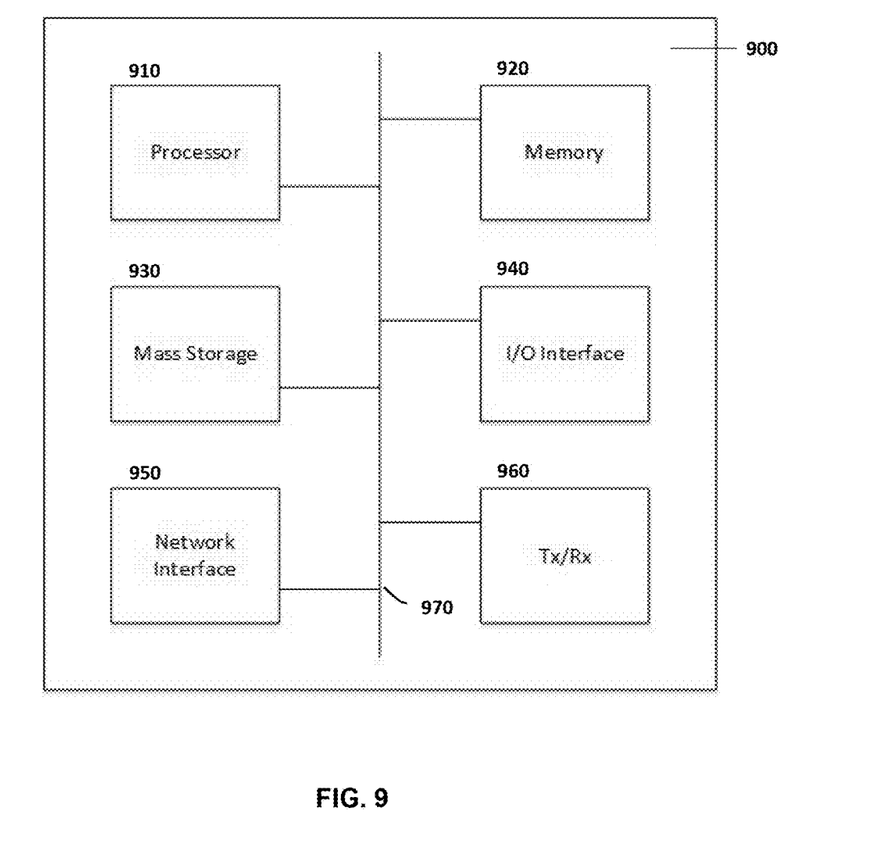
FIG. 9 is a schematic diagram of an electronic device, in accordance with embodiments of the present invention.

FIG. 9 is a schematic diagram of an electronic device 900 that may perform any or all of the steps of the above methods and features described herein, according to different embodiments of the present invention. For example, a vehicle control system may be configured as the electronic device. Further, a wayside control system may be configured as the electronic device 900.

As shown, the device includes a processor 910, memory 920, non-transitory mass storage 930, 110 interface 940, network interface 950, and a transceiver 960, all of which are communicatively coupled via bi-directional bus 970. According to certain embodiments, any or all of the depicted elements may be utilized, or only a subset of the elements. Further, the device 900 may contain multiple instances of certain elements, such as multiple processors, memories, or transceivers. Also, elements of the hardware device may be directly coupled to other elements without the bi-directional bus.

The memory 920 may include any type of non-transitory memory such as static random access memory (SRAM), dynamic random access memory (DRAM), synchronous DRAM (SDRAM), read-only memory (ROM), any combination of such, or the like. The mass storage element 930 may include any type of non-transitory storage device, such as a solid state drive, hard disk drive, a magnetic disk drive, an optical disk drive, USB drive, or any computer program product configured to store data and machine executable program code. According to certain embodiments, the memory 920 or mass storage 930 may have recorded thereon statements and instructions executable by the processor 910 for performing any of the aforementioned method steps described above.

It will be understood that that the use of the terms "amusement ride" when describing the vehicle and control system of the instant application, are to be considered as non-limiting in relation to the applications for which the vehicle and control system can be used. For example, an amusement ride vehicle can be used as a vehicle at an amusement park, theme park, safari park or other type of park application in the entertainment industry. Furthermore, the amusement ride vehicle can be used as a touring vehicle, for example for touring a particular library, gallery or other facility. Other applications or uses of the vehicle and control system of the instant application would be readily understood by a worker skilled in the art.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. An amusement ride vehicle comprising:
   a transport assembly configured to move the vehicle, the transport assembly including a propulsion system and a steering system; and
   a control system operative to provide operational instructions to the propulsion system and the steering system, the control system further including a vehicle navigation controller having at least two channels, each channel independently collecting operational characteristics of the vehicle, the control system operative to at least compare the operational characteristics from each channel to determine accuracy of the operational characteristics, and the control system further operative to process the operational characteristics together with a defined path of travel of the vehicle for determination of the operational instructions.

2. The amusement ride vehicle according to claim 1, further comprising a payload compartment operatively connected to the transport assembly, wherein the payload compartment is configured for carrying one or more of guests and equipment.

3. The amusement ride vehicle according to claim 2, further comprising a motion system operative to influence relative motion between the payload compartment and the transport assembly.

4. The amusement ride vehicle according to claim 3, wherein the motion system includes one or more of a motion base, a passive suspension system and an active suspension system.

5. The amusement ride vehicle according to claim 1, further including a guest input interface operatively connected to the control system, the guest input interface provides guest operational instructions, wherein the control system is operative to process the operational characteristics, the defined path of travel of the vehicle and the guest operational instructions for determination of the operational instructions.

6. The amusement ride vehicle according to claim 5, wherein the control system assigns a level of influence of the guest operational instructions, wherein the level of influence varies between 0% and 100%.

7. The amusement ride vehicle according to claim 1, wherein the control system is communicatively connected to a wayside control system, the control system configured to receive data from the wayside control system, wherein the data is indicative of one or more of other vehicles, amusement ride parameters, vehicle exclusion zones and zone dwell times.

8. The amusement ride vehicle according to claim 1, wherein each channel receives data from a different sensor array, each sensory array configured to collect data indicative of at least vehicle location and vehicular angular orientation.

9. A method for controlling an amusement ride vehicle, the amusement ride vehicle including a propulsion system and a steering system for moving the vehicle, the method comprising:
   receiving a first input from a first sensory array, the first input indicative of vehicle operational status and location;
   receiving a second input from a second sensory array, the second sensory array independent from the first sensory array, the second input indicative of vehicle operational status and location;
   comparing the first input and the second input thereby determining accuracy of the received vehicle operational status and location;
   upon determination that the first input and second input vary by less than a predefined tolerance, comparing the vehicle operational status and location with a desired route;
   calculating operational parameters for the propulsion system and the steering system based on a variation between the vehicle operational status and location with a desired route; and
   transmitting instructions to the propulsion system and the steering system, the instructions indicative of the operational parameters.

10. The method according to claim 9, further comprising:
    receiving a third input from a third sensory array, the third sensory array independent from the first sensory array and the second sensory array, the input indicative of vehicle operational status and location; and
    comparing the third input with the first input and the second input thereby evaluating additional accuracy of the received vehicle operational status and location.

11. The method according to claim 9, further comprising:
    receiving global operational parameters from a wayside control system, the global operational parameters indicative of at least one of operational parameters of other vehicles and amusement ride interaction limits; and calculating operational parameters for the propulsion system and the steering system based on the variation between the vehicle operational status and location with the desired route and further based on the global operational parameters.

12. The method according to claim 9, further comprising:
receiving guest input indicative of one or more guest defined operational parameters for the vehicle; and
calculating operational parameters for the propulsion system and the steering system based on the variation between the vehicle operational status and location with the desired route and further based on the guest defined operational parameters.

13. The method according to claim 12, wherein the guest defined operational parameters have a level of influence, and the level of influence is used accounted for when calculating operational parameters.

14. The method according to claim 13, wherein the level of influence varies between 0% and 100%.

15. A control system for an amusement ride vehicle, the amusement ride vehicle including a propulsion system and a steering system for moving the vehicle, the control system comprising:
a network interface for receiving and transmitting data;
a processor; and
a non-transient memory for storing instruction that when executed by the processor cause the control system to:
receive a first input from a first sensory array, the first input indicative of vehicle operational status and location;
receive a second input from a second sensory array, the second sensory array independent from the first sensory array, the second input indicative of vehicle operational status and location;
compare the first input and the second input thereby determining accuracy of the received vehicle operational status and location;
upon determination that the first input and second input vary by less than a predefined tolerance, compare the vehicle operational status and location with a desired route;
calculate operational parameters for the propulsion system and the steering system based on a variation between the vehicle operational status and location with a desired route; and
transmit instructions to the propulsion system and the steering system, the instructions indicative of the operational parameters.

16. A method for controlling at least two amusement ride vehicles in an amusement ride, the method comprising:
receiving first operational data from a first vehicle, the first operational data indicative of first vehicle operational status and location;
receiving second operational data from a second vehicle, the second operational data indicative of second vehicle operational status and location;
correlating the first operational data, the second operational data and parameters of the amusement ride;
upon correlation, determining first operational parameters for the first vehicle and second operation parameters for the second vehicle; and
transmitting the first operational parameters to the first vehicle and transmitting the second operational parameters to the second vehicle.

17. A wayside control system for controlling at least two amusement ride vehicles in an amusement ride, the wayside control system comprising:
a network interface for receiving and transmitting data;
a processor; and
a non-transient memory for storing instruction that when executed by the processor cause the control system to:
receive first operational data from a first vehicle, the first operational data indicative of first vehicle operational status and location;
receive second operational data from a second vehicle, the second operational data indicative of second vehicle operational status and location;
correlate the first operational data, the second operational data and parameters of the amusement ride;
upon correlation, determine first operational parameters for the first vehicle and second operation parameters for the second vehicle; and
transmit the first operational parameters to the first vehicle and transmitting the second operational parameters to the second vehicle.

* * * * *